United States Patent [19]

Huhnen

[11] 3,964,736

[45] June 22, 1976

[54] HELICAL EXTENSION SPRING AND METHOD OF MAKING SAME

[76] Inventor: Joachim Walter Gerhard Huhnen, Blankensteinstr. 24, D-7141 Steinheim, Murr, Germany

[22] Filed: June 3, 1974

[21] Appl. No.: 475,805

[30] Foreign Application Priority Data
June 1, 1973   Germany............................ 2327796

[52] U.S. Cl. ............................................... 267/166
[51] Int. Cl.² ............................................ F16F 1/12
[58] Field of Search ................ 267/73, 74, 69, 166, 267/112, 179, 180, 110, 111

[56] References Cited
UNITED STATES PATENTS

| 924,724 | 6/1909 | Benson | 267/179 |
|---|---|---|---|
| 2,040,656 | 5/1936 | Kirstein | 267/74 |
| 2,524,293 | 10/1950 | Lindstrom | 267/74 |
| 3,292,884 | 12/1966 | Scheldorf | 267/180 |

FOREIGN PATENTS OR APPLICATIONS

| 606,718 | 11/1934 | Germany | 267/74 |
|---|---|---|---|

*Primary Examiner*—James B. Marbert

[57] ABSTRACT

Helical tension spring having a spring body and two eyelets or loops integrally formed with the body of the spring at the ends thereof, the free ends of the eyelets contacting the end coils of the spring body. Each eyelet is under a prestress force which has to be overcome in order to lift the eyelet from the adjacent end coil of the spring body, such pre-stress force being larger than the force applied at the eyelet, which force is necessary to separate the coils of the spring body by a certain distance.

The invention also relates to a process of producing the above spring. At both of the end coils of the spring body there is formed a wire section in a plane approximately normal to the spring body. Such wire section as a whole is bent in the plane containing the axis of the spring body, and the wire section is formed into an eyelet by means of a force acting in the direction of the axis of the spring body, such force being applied approximately in the middle of the wire section as being a tensional force which plastically and elastically deforms the eyelet, so that the end sections of the eyelet elastically contact the end coils of the spring body.

7 Claims, 18 Drawing Figures

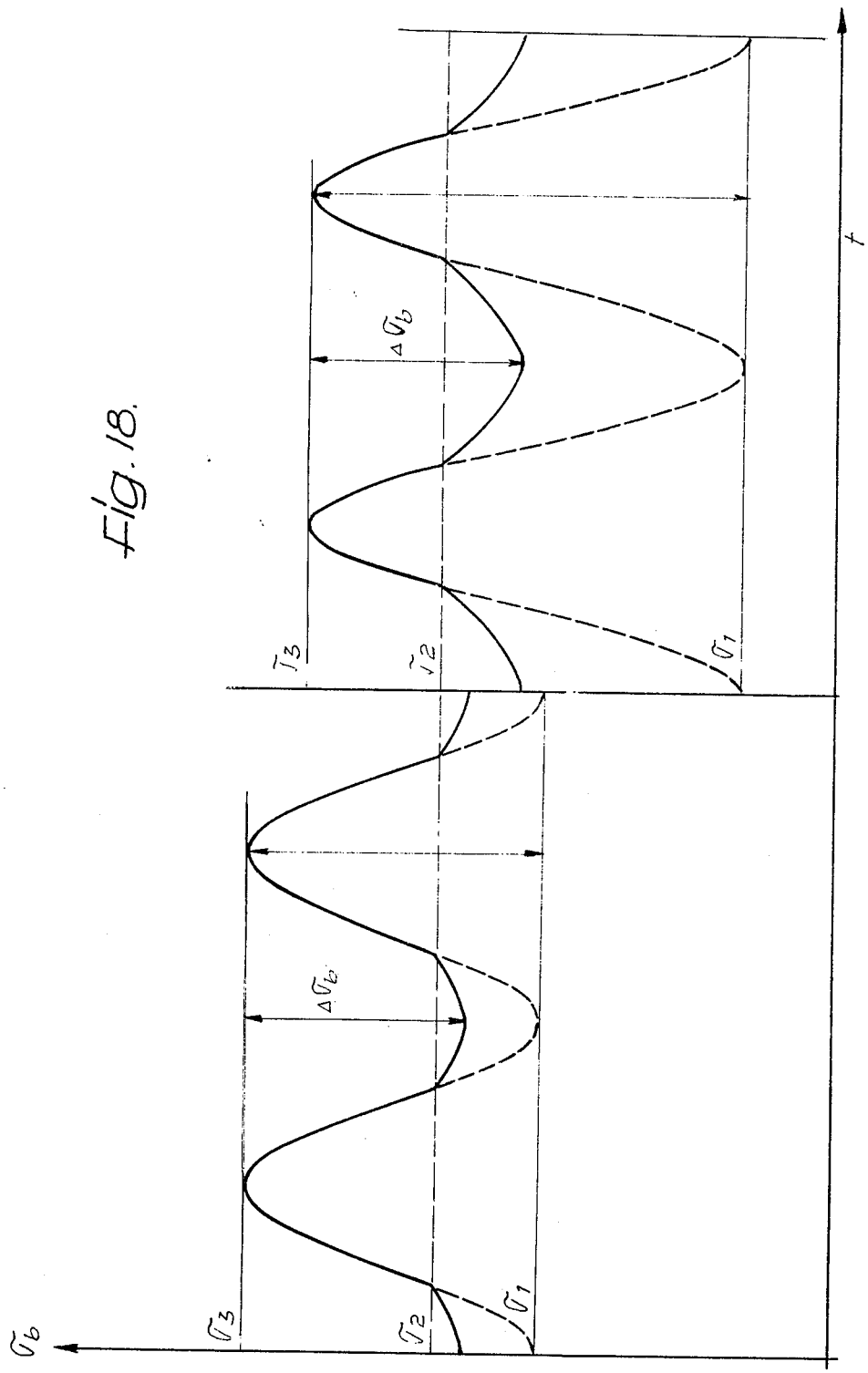

HELICAL EXTENSION SPRING AND METHOD OF MAKING SAME

This invention relates to a helical extension spring with a spring body and two eyelets or loops formed integrally with the body, the free ends of the eyelets touching the two end coils of the spring body; the invention also relates to a method of making such spring.

In the known helical extension springs, the eyelets on the spring body are manufactured by bending a half coil up to two coils of the spring body to form each eyelet. Insofar as such eyelets bear upon the spring body with a pre-stress, the pre-stress forces in the eyelets which are formed of a half loop attain in the maximum case the value of the pre-stress forces which can be produced with conventional coiling and winding methods in the spring body; the pre-stress forces in eyelets consisting of one to two coils are, by comparison, even smaller. It is to be understood that "pre-stress force" means that force which acts in the direction along the longitudinal axis of the spring, such force causing a lifting-off of the wire ends or full eyelet coils from the adjacent end coil of the spring body. In both cases the pre-stress forces are purely accidentally created and there is no teaching in the state of the art of spring manufacture according to which this pre-stress force may be utilized for the attainment of any particular effects. Many times these pre-stress forces are almost zero, and furthermore there are many cases in which the complete loops or eyelets or the wire ends lie at a predetermined accurate distance from the spring body. This is especially the case with loops or eyelets which are formed from a half coil of the spring body.

It is well-known that in all helical extension springs with eyelets or loops which are manufactured in the above-described manner from the coils of the spring body, or with loops or hooks having other forms and starting on the coil-diameter of the cylindrical spring body, with large stress ranges the loops or eyelets always break first at their roots, that is their beginnings.

In the conventional design of such helical extension springs, considering present-day know-how in the spring manufacturing art, the alternating bending stress at the eyelet-root is always approximately 1.5 times as big as the bending fatigue strength of the spring-wire when the spring body is stressed up to its torsional fatigue strength. As a result, the much larger wire length of the spring body, in comparison to the length of the wire in the loop or eyelet, can never be used to its full working capacity. The only way in which the spring body of a conventional helical tension spring can be employed to its full fatigue strength is by making the end coils on the spring body with a coil diameter which is approximately two-thirds of the coil diameters of the remaining coils of the spring body, and make the eyelet or loop of the spring with such decreased diameter. Such construction, however, cannot be used in springs which already have a small ratio of coil diameter to wire diameter (the so-called spring index). With larger values of this ratio, a few coils are necessary to effect the transition from the spring body diameter to the smaller end coil diameter. These understressed end coils unneccesarily increase the total lengths (not only the initial length but also the loaded lengths) of the spring.

In helical extension springs which are manufactured in a prior process suggested by me and known as twist winding, very large wound-in pre-stresses, never before achieved in mass production are present in the spring body; in such springs the until now known eyelets or loops would be disadvantageous, as they already have a considerable spring deflection before the coils of the spring body lift off from each other. The advantage of these springs, however, consists in the fact that they save considerable space if the minimum operational forces are larger than the initial forces available with conventional manufacturing methods. This advantage, however, is decreased if through the springing of the eyelets or loops there is already formed a spring deflection before the loops of the spring body lift off from each other. Furthermore, with springs manufactured in this last-described method when large stress ranges are exerted, conventional eyelets or loops break-off before the spring body proper breaks. Finally, helical extension springs with large spring index and extremely large pre-stress forces, which would thus save considerable space, should also have eyelets or end loops that do not waste space, that is, the eyelets or loops should have the smallest possible axial heights.

The invention has among its objects the provision of a helical extension spring with low-built or shaped eyelets or end loops, whose fatigue strength is at least as large as the fatigue strength of the spring body, and which contribute as little as possible to the deflection of the spring, as well as a method for the making of such spring. These objects are attained by providing a spring into each eyelet or end loop of which there is built-in an initial force which exceeds the force necessary to lift off the adjacent coils of the spring body, such initial force being larger than the force supplied to the eyelets or loops, which produces a torsional stress in the spring body which amounts to a tenth of the tensile strength of the spring wire from which the spring is formed. At each end of the spring body one wire section is formed in a plane disposed approximately normal to the longitudinal axis of the spring body, and this wire as a whole is bent approximately in a plane containing the axis of the spring body, the wire sections thereafter being plastically and elastically deformed into eyelets at least by tensile forces being applied in the middle of the wire section approximately in the direction of the longitudinal axis of the spring body, such eyelets elastically bearing upon the end coils of the spring body.

According to a usual rule of thumb, with conventional spring coiling and spring winding the wound-in pre-stress of the spring body amounts to 10% of the tensile strength of the spring wire; as already mentioned maximally conventional eyelets can abut the spring body with a force which corresponds to such pre-stress. In comparison, the helical extension spring according to the present invention has the bent-in initial pre-stress force of each eyelet deliberately larger than the wound-in pre-stress force of the spring body, and, as a matter of fact as large as possible. It is thereby assured that the life of the eyelets is equal to the fatigue life of the spring body by decreasing the alternating stress at the eyelets. Furthermore, the eyelets under working conditions are deformed so that they constitute only a negligibly small spring deflection before the lift-off of the ends of the eyelets from the end coils of the spring body. As a result, the helical extension spring of the invention permits the utilization of the total working capacity of the spring body, which increases its importance with an increase in the number of coils which the spring body has, because in such a case the wire length of the eyelets, which in general dictate the fatigue life of the spring, amount to only a fraction of the total wire length.

The process according to the invention can be carried out with or without intermediate heat treatment, which maybe, depending on the material used, an annealing or hardening or tempering. When the highest possible initial pre-stress is to be attained, the wire sections which are to be formed on and bent off the spring body must be heat treated prior to their last plastic and elastic deformation. On the other hand, if it is desired that the forming process be as continuous as possible, then the heat treatment can follow the last plastic and elastic deformation. A smaller pre-stress must, however, then be accepted.

In the first preferred embodiment of the process of the invention, which is particularly suitable for the manufacture of springs with middle or large ratios of the diameter of the end coils to the diameter of the spring wire, it is provided, that a straight, tangentially extending shank of the wire section is formed, and that each shank at its starting point is angularly bent into a position in which it extends along a diameter transversely over the adjacent end coil, and that each of the angularly bent shanks at its free end portion and at the starting point is held in abutment with the adjacent end coil, as long as the pulling force acts on it. Of course, the forming and angular bending of the shanks can be carried out in one step with the manufacture of the spring body.

With another preferred embodiment of the process of this invention, which is particularly suitable for manufacturing springs with middle or small ratios of the diameter of the end coils to the diameter of the spring wire, it is provided that at each end a wire section deviating from the adjacent end coil is formed, that the thus formed wire section is bent at a suitable position of the end coil and that the wire section after the plastic and elastic deformation is put onto the end coil, whereby the suitable position is selected in such a way that the wire ends after the bending are situated between the planes defined by the end coils. With this process it is possible to proceed so that the wire sections are more softly bent than the end coils and that the putting on of the wire end is carried out under a more pronounced bending of the wire end section, or that the wire end sections are more pronouncedly bent than the end coils and that the putting on of the wire ends results when widening the bent wire sections. Of course, it is also possible to bend the wire end sections first of all as well as the end coils, and then at least at a predetermined position irregularly change the curvature before bending.

There follows now in conjunction with the drawings illustrations of different steps in the process of the invention, and different embodiments of the helical tension spring of the invention. In the drawings:

FIGS. 1 to 9, inclusive, illustrate a first embodiment of the method and the pre-stages thereof;

Figure 17:
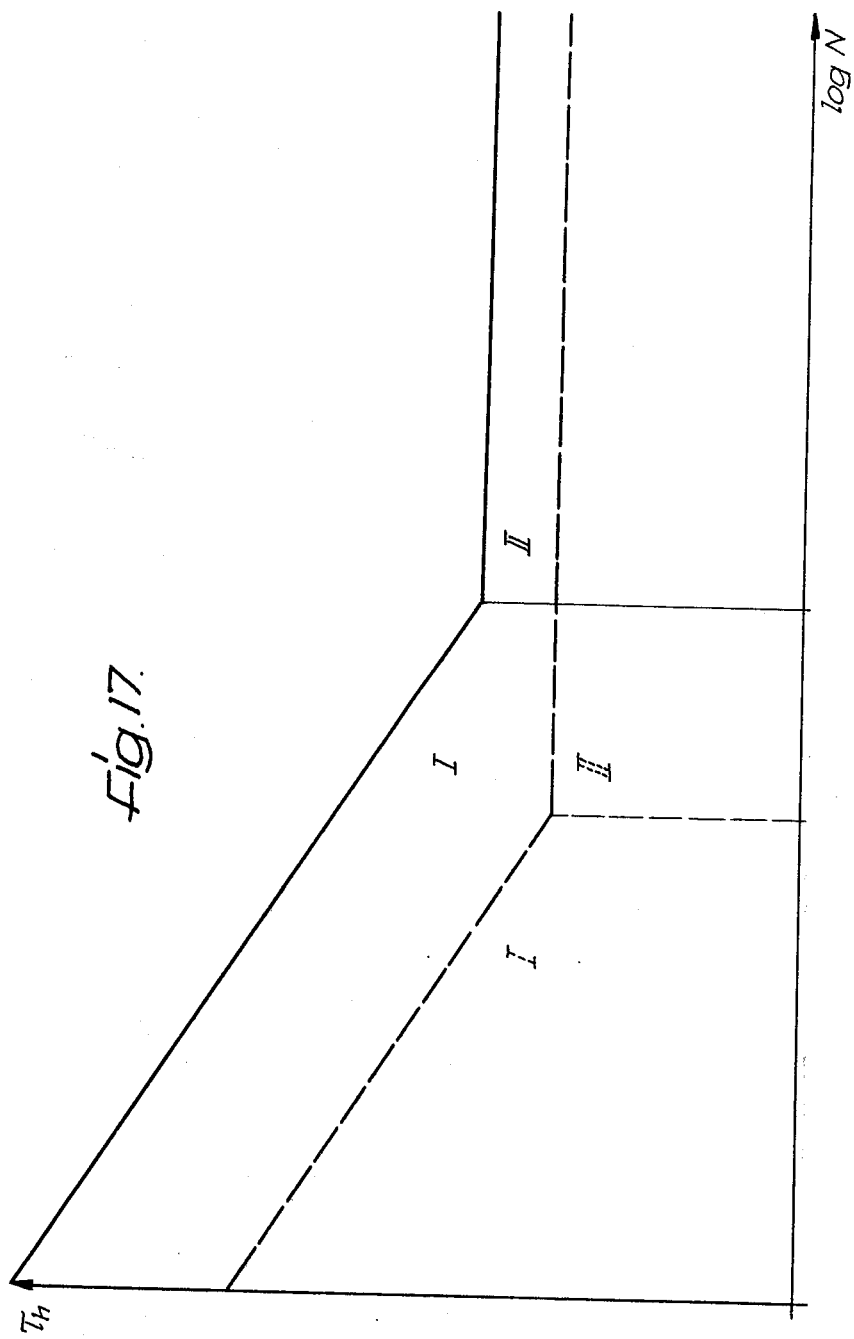

FIG. 17 is a so-called "Woehler-graph" in which the Woehler-lines for a conventional helical extension spring are shown in dash lines and the Woehler-lines for a helical extension spring in accordance with the invention are illustrated in solid lines; and FIG. 18 illustrates the loading of the eyelets for springs according to the present invention as well as for conventional springs; at the left-hand portion of this figure there is shown the loading of twist wound springs with a high mean stress and slow stress range, and at the right hand portion of the figure there is shown the loading for normally wound springs with smaller mean stress and high stress range.

Figure 1:
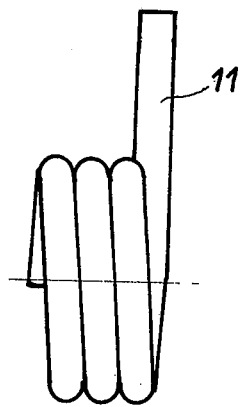
Figure 2:
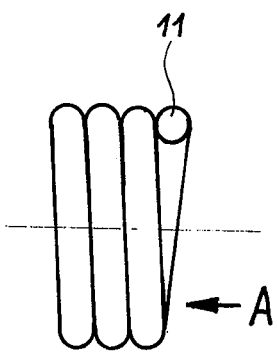
Figure 3:
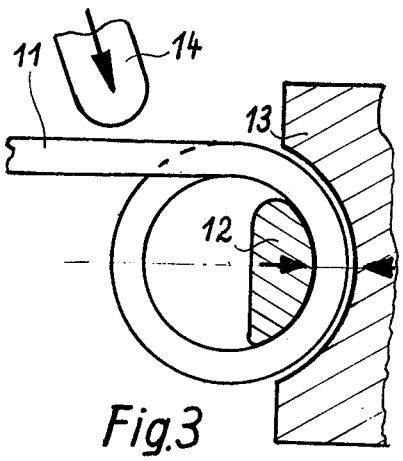

The side views illustrated in FIGS. 1 and 2 show two side views shifted 90° with respect to each other, and FIG. 3 is a top view in the direction of the arrow A of the end of a spring body of a first embodiment. Onto such spring body there is bent a straight, tangentially extending shank 11. FIG. 3 schematically illustrates the jaws 12 and 13 of a clamping device and a ram 14 for angularly bending the shank 11.

Figure 4:
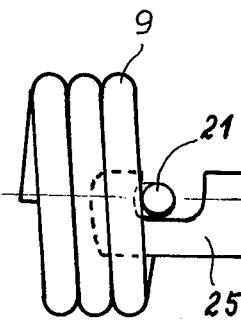
Figure 5:
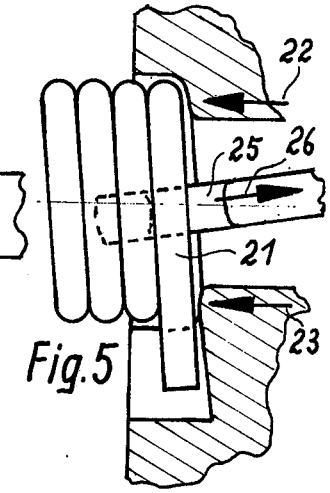
Figure 6:
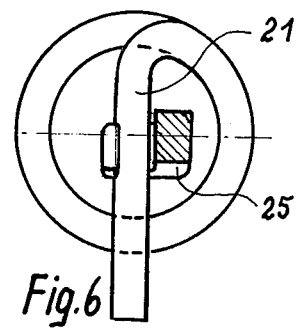

FIGS. 4 to 6 illustrate in the same types of views as FIGS. 1 to 3, incl., respectively, the same end of the spring body after the angular bending of the shank 11 at its starting point in a position in which it extends along a diameter transversely over the adjacent end coil 9 and thereby forms a bridge or cross piece 21. It can be noted that the angular bent shank 11, or now the cross piece 21 at its free end section, toward which the arrow 23 points, and at the starting point, which is indicated by the arrow 22, is held in abutment with the adjacent end coil 9 of the spring body and furthermore is deformed into an eyelet 31 by means of a tension or pulling force acting approximately in the direction of the arrow 26, being exerted substantially in the middle of the cross piece 21, said tensional or pull force being applied by a hook-shaped tool 25.

Figure 7:
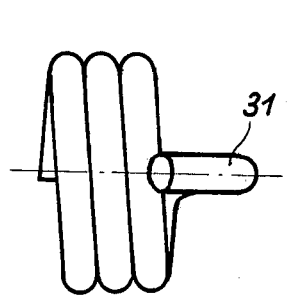
Figure 8:
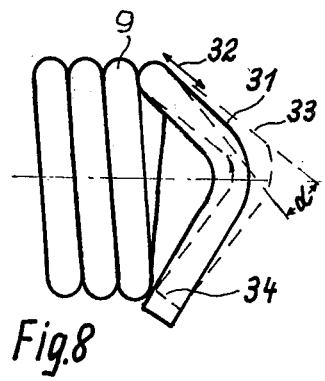
Figure 9:
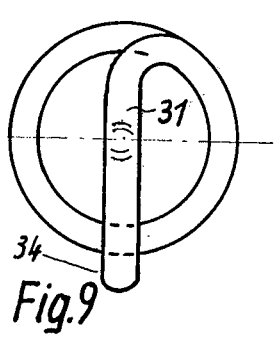

FIGS. 7 to 9 illustrate the same end of the spring again in the same views as FIGS. 1 to 3, incl., after the plastic and elastic deformation of the corss piece 21 into an eyelet 31. As can be noted from FIG. 8, the upper illustrated half of the eyelet 31 is pulled first of all during the plastic and elastic deformation of the root section 32 into the position 33. If the free eyelet end 34 were not simultaneously held in abutting contact against the end coil 9, then the eyelet 31 could, for example, elastically snap back through the illustrated angle $\alpha$. It is, however, possible and desirable to create only after the removal of the hook-shaped tool 25 from the eyelet 31 partial de-tensioning of the eyelet, which results in a large initial pre-stress force with which the free eyelet end 34 abuts against the end loop 9.

Figure 10:
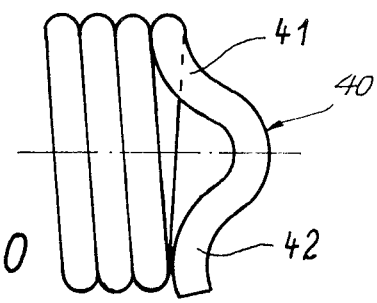
FIG. 10 illustrates a variation of the first embodiment.

A first variant of the invention is shown in FIG. 10, which corresponds generally to FIG. 8. This variant essentially corresponds in most other respects to the embodiment of FIGS. 1 to 9. In this embodiment, however, both halves of the eyelet 40 have bent portions 41, respectively 42 abutting against the spring body. Such bent portions are created during the deformation of the cross piece under tensional force. The advantage of the bent portions 41 and 42 resides in that they contribute to the pre-stress force, in view of their elastic deformation, with which the lower half of the eyelet 40 abuts against the spring body.

Figure 11:
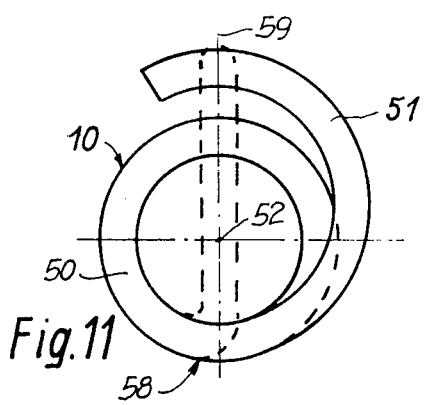
FIGS. 11 to 13 illustrate a second variation of the method and its pre-stages.
Figure 12:
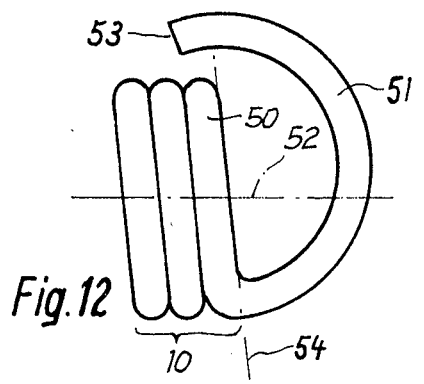
Figure 13:
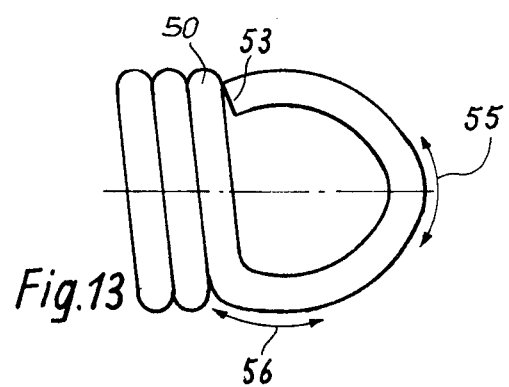

FIGS. 11 to 13, incl., illustrate respectively a top view and two side views of one end of the spring body 10 of the second embodiment, at the end coil 50 of which there is formed a wire section 51 which is more moderately bent (less curvature). FIG. 12 illustrates the condition after the angular bending of the wire section 51 about 90° at the position 58, which condition is illustrated in dashed lines in FIG. 11. In this condition the wire section 51 is situated in a plane 59 which contains also the axis 52, whereby the free wire end 53 is located after the angular bending behind a plane 54 adjacent to the spring body 10, said plane being determined by the adjacent coil 50. FIG. 13 illustrates the final condition of the eyelet after the deforming by means of a pulling force and the simultaneous squeezing together of the wire end sections 51 as well as the following putting the wire end 53 into abutment with the end loop 50. As can be noted in the last phase of the manufacturing process, the greatest deformation occurs in the sections 55 and 56. The elastic pre-tension force is, however, principally created by the root section 56.

Figure 14:
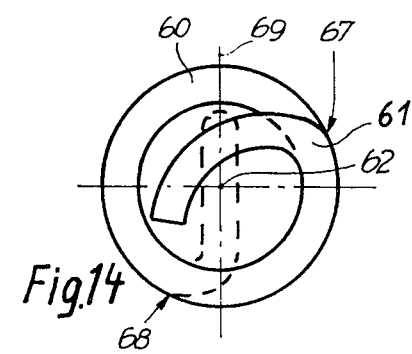
FIGS. 14 to 16 illustrate a third variation of the method in its pre-stages.
Figure 15:
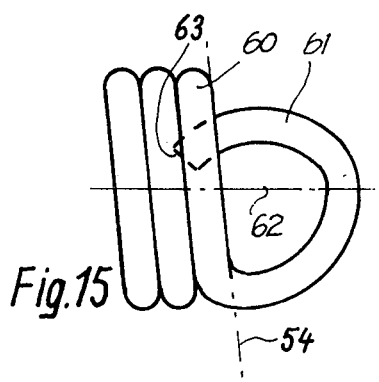
Figure 16:
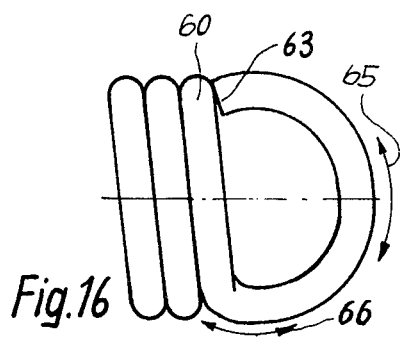

The third embodiment, illustrated by FIGS. 14 to 16, incl., is manufactured in a very similar manner. Here, however, the wire end section 61 is more strongly bent than the end 60 coil in such manner that; the wire end section 61, which exhibits at first the bending of the end coil at the position 67, is buckled inwardly at the position 67 and a widening of the bent wire end section 61 takes place. This, of course, is again accompanied by a simultaneous deformation of the bent wire end section by means of a pulling force.

The partitioning and positioning of the respective parts of the third embodiment (FIGS. 14 – 16, incl.) which correspond to the second embodiment, shown in FIGS. 11 to 13, have been labeled with the same reference numerals increased by 10.

The two Woehler-lines in FIG. 17 respectively illustrate the dependency of the linearly traced torsional stress range $\sigma h$ for the spring body shown as the ordinate with the number of cycles to failure N of the eyelets drawn logarithmically on the absissca cycles to. It is apparent that the region of fatigue strength for finite life, that is the region I lying to the left of the breaking point of the Woehler line as well as the region II of fatigue strength on the right of the breaking point in case of the helical tension spring of this invention is substantially larger than those of the conventional helical springs. In the region I of fatigue strength for finite life there is the fatigue life for the spring accordng to the invention 4 to 10 times as large, whereas in the fatigue strength region II with the spring according to the invention the fatigue strength is from 30% to 50% higher as those with the conventional springs.

The scaled FIG. 18 illustrates the loading of the eyelets with springs of this invention as well as with conventional drill wound springs, and in fact, on the left for twist wound springs with a high means stress $(\sigma_3+\sigma_1)/2$ and slow stress range and on the right for normally wound springs with smaller mean stress and high stress range; for instance

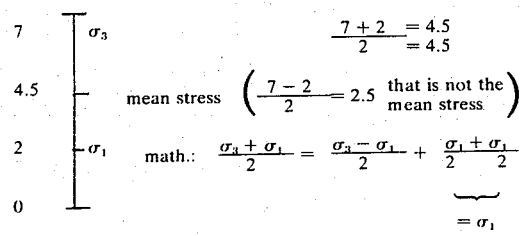

the mean stresses are not shown as lines in FIG. 18 with a view to clearness of the figure, $\sigma_3$ is the symbol for the permissible maximum stress of the spring material. The dependency of the alternating stress $\sigma_b$ at the eyelet root to the time $t$ is illustrated with dash lines for conventional springs and with full lines for helical tension springs in accordance with the invention. It is apparent that in both cases the entire stress ranges $\sigma_b$ for the eyelet of the springs of the invention are significantly smaller as for the eyelets of conventional springs, whereby the difference is the larger the smaller the minimum stress $\sigma_1$ of the eyelets is. The characteristic relationship of the helical tension springs of the invention can be gleaned from the fact that the free eyelet end at the stress $\sigma_2$ is lifted off from the adjacent loop of the spring body respectively abuts against it, whereby a deciding reduction of the stress range $\sigma_b$ is combined with it.

Although the invention is illustrated and described with reference to plurality of preferred embodiments thereof, it is to be expressly understood that it is in no way limited to the disclosure of such a plurality of preferred embodiments, but is capable of numerous modifications within the scope of the appended claims.

What is claimed is:

1. A helical tension spring having a spring body and two preformed terminal eyelets formed integrally therewith, the free ends of the eyelets contacting the respective end coils of the spring body, each such eyelet exhibiting a localized outward bend in a substantially axial plane of the spring for exerting an initial axial pre-stress force which has to be overcome in order to lift the eyelets off from the adjacent end coils of the spring body, such initial axial pre-stress force being larger than a force normally applied at the eyelet during the use of the spring, which force causes in the spring body a torsion stress which is on the order of a tenth of the tensile strength of the spring wire.

2. A process for producing a helical tension spring having a spring body and two terminal eyelets formed integrally therewith, which comprises the steps of forming the ends of a coil spring body as wire sections that extend from the spring body in a transverse plane, bending each such end wire section as a whole into an axial plane of the spring body, and plastically and elastically deforming each such bent end wire section into an eyelet exhibiting a localized outward bend in the axial plane of the spring by exerting at least an outward force on such bent end wire section along the spring axis, each resulting eyelet bearing elastically against the adjacent end coil of the spring body with an axial pre-stress force larger than a force normally applied at the eyelet during the use of the spring, which force causes in the spring body a torsion stress which is on the order of a tenth of the tensile strength of the spring wire.

3. A process according to claim 2, comprising heat treating the deformed and bent wire end sections prior to their last plastic and elastic deformation.

4. A process according to claim 2 for manufacturing springs having middle or larger ratios of diameters of the end coils to diameter of the spring wire, comprising forming a straight, tangentially extending shank portion as a wire end section, and bending each shank at the starting point in a position in which it extends transversely over the adjacent end coil along a diameter, and holding each of the bent shanks at its free end section and the starting point against the adjacent end coil as long as the pulling force acts on it.

5. A process according to claim 2 for producing springs with middle or smaller ratios of the diameter of the end coils to the diameter of the spring wire, comprising forming a bent wire end section deviating from the adjacent end coil, bending away the thus formed wire end section at a suitable position of the end coil, and after the plastic and elastic deformation of the wire end section pulling the wire end section onto the end coil, whereby the wire ends after the bending are situated between the planes determined by the end coils.

6. A process according to claim 5, wherein the wire end sections are more weakly bent than the end coils, and that the putting on of the wire ends is carried out by intensifying the bending of the wire end sections.

7. A process according to claim 5, wherein the wire end sections are more strongly bent than the end coils, and thus the putting on of the wire ends results from widening of the bent wire end sections.

* * * * *